(12) United States Patent
Figovsky et al.

(10) Patent No.: US 8,980,148 B2
(45) Date of Patent: Mar. 17, 2015

(54) METHOD OF MANUFACTURING A TRACK MEMBRANE

(75) Inventors: Oleg Figovsky, Haifa (IL); Elena Gotlib, Kazan (RU); Dmitry Pashin, Kazan (RU); Alexander Leykin, Haifa (IL)

(73) Assignees: Nanotech Industries, Inc., Daly City, CA (US); Polymate, Ltd., Migdal Ha'emeq (IL)

( * ) Notice: Subject to any disclaimer, the term of this patent is extended or adjusted under 35 U.S.C. 154(b) by 483 days.

(21) Appl. No.: 13/442,799

(22) Filed: Apr. 9, 2012

(65) Prior Publication Data

US 2013/0264737 A1    Oct. 10, 2013

(51) Int. Cl.
  *B28B 1/48* (2006.01)
  *B01D 67/00* (2006.01)
  *B01D 71/26* (2006.01)
  *B01D 71/36* (2006.01)

(52) U.S. Cl.
  CPC ............ *B01D 67/0032* (2013.01); *B01D 71/26* (2013.01); *B01D 71/36* (2013.01); *B01D 2323/44* (2013.01)
  USPC .............................. 264/84; 264/156; 264/158

(58) Field of Classification Search
  CPC ........... B29C 44/5627; B01D 67/0023; B01D 67/0032
  USPC ............................................ 264/84, 156, 158
  See application file for complete search history.

(56) References Cited

U.S. PATENT DOCUMENTS

| 3,303,085 | A | 2/1967 | Price et al. |
| 3,770,532 | A | 11/1973 | Bean et al. |
| 3,802,972 | A | 4/1974 | Fleischer et al. |
| 4,960,430 | A | 10/1990 | Koerber et al. |
| 5,330,790 | A | 7/1994 | Calkins |
| 7,001,501 | B2 | 2/2006 | Spohr et al. |
| 7,597,815 | B2 | 10/2009 | Desyatov et al. |
| 7,897,204 | B2 | 3/2011 | Usherenko |

FOREIGN PATENT DOCUMENTS

RU    2425912 C2    8/2011

*Primary Examiner* — James Sanders
(74) *Attorney, Agent, or Firm* — TransPacific Law Group; Pavel Pogodin, Esq.

(57) ABSTRACT

Method of manufacturing track membranes by penetration of working substances into and through the membrane matrix of polymer material is disclosed. The matrix is placed into holder that is inserted into one end of a tubular shell, the other end of which contains a cartridge with an explosive material and a working substance in the form of a supersaturated solution of a water-soluble salt. When the explosive material is detonated, the particles of the water-soluble salt interact with the matrix in the form of a high-speed jet with the velocity of particles in the range of 3800 to 4200 m/sec. As a result of penetrating of the particles into and through the material of the matrix, a plurality of holes is formed in the matrix. The track membranes are produced by slicing the membrane matrix after removal of the residue of the particles by washing the pierced membrane with water.

18 Claims, 3 Drawing Sheets

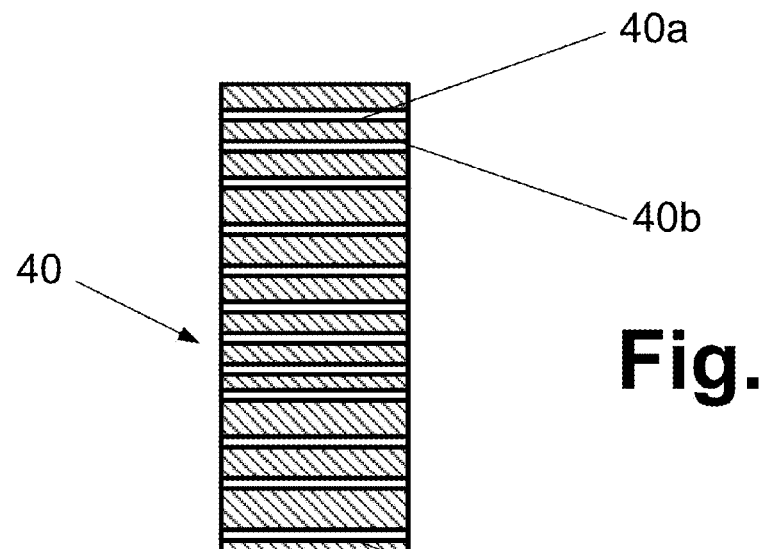
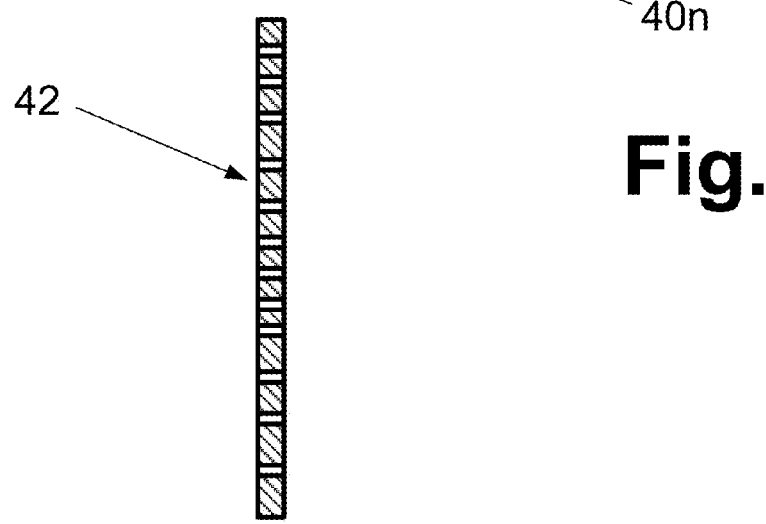

METHOD OF MANUFACTURING A TRACK MEMBRANE

BACKGROUND OF THE INVENTION

1. Field of the Invention

This invention relates to a process of manufacturing track membranes by deep penetration of a working substance into and through the matrix of a polymer material. The working substance interacts with the matrix in the form of a high-speed jet generated and energized by an explosion of an explosive material.

2. Description of the Related Art

Membrane technology is a rapidly growing field with applications of great economical and ecological significance. Precision track membranes are well known in the art. A multitude of straight through apertures in sheets of various materials, such as polymeric plastic, formed by homogeneously bombarding the sheet of material with a source of heavy energetic charged particles (heavy ions) to produce damage tracks, have been described and claimed in U.S. Pat. No. 3,303,085 issued to Price et al. on Jan. 7, 1967, which is incorporated by reference herein. On subsequent stages of the membrane manufacturing process, the radiation damaged materials are removed by chemically etching the resulting membrane, for example by submersing the irradiated solid in an etchant. Various chemical reagents (etchants) and etching methods are described, for example, in U.S. Pat. No. 3,770,532 issued to Bean et al. on Nov. 6, 1973; U.S. Pat. No. 3,802,972 issued to Fleischer, et al. on Apr. 9, 1974; U.S. Pat. No. 7,001,501 issued to Spohr, et al. on Feb. 21, 2006; U.S. Pat. No. 7,597,815 issued to Desyatov, et al. on Oct. 6, 2009, which are all incorporated by reference herein. Membranes produced using the aforesaid methodology are usually characterized by average disperse dimension of open pores ranging from 10 nanometers to 10 microns. Needless to say, that the described method for manufacturing of membranes by means of heavy ion bombardment is very expensive and time consuming. On the other hand, there is a need in the industry for cheaper membrane products with dimension of open pores ranging from 1 to 500 microns.

At the same time, there are various methods of treatment of different materials and products, including polymers, with the use of explosive energy. For example, U.S. Pat. No. 4,960,430 issued on Oct. 2, 1990 to Koerber, et al. discloses a treatment of synthetic polymeric materials by contacting endless sheet-like, ribbon-shaped or filiform polymeric products with 0.1 to 2 mm size particles of sand, glass, corundum or a metal by directing onto the surface a stream of gas carrying the aforesaid particles. This gives the textile structures a rough, woolly, soft feel and they are mat, while films become rough and mat and have a low transparency.

A method of treating a surface of a polymeric article by impact implantation with particulate material to attain hardening, abrasion resistance or other altered surface characteristics is described in U.S. Pat. No. 5,330,790 issued to Calkins in 1994. High-pressure treatment with a slurry of a liquid mixed with a ceramic particulate material ranging in size from 66 to 350 μm, methods of ultrasonic and mechanical particle implantation are disclosed. Similarly, impact implantation with electrically conductive or magnetic materials can be employed to attain a conductive surface or a surface having electromagnetic radiation absorption characteristics. Along with other techniques said particulate material can be driven by shock waves created by detonation of a sheet explosive material. The invention may be practiced with the commercially available plastic materials, including the common thermoplastic such as the nylons, polyimides and polyetheretherketones, the polyolefins such as polyethylene and polypropylene, the fluoroplastics, polyamide-imides, polycarbonates, ABS, and others as well as thermoset plastics, and including filled, reinforced and composite variations of these materials. Ceramic macro particle for implantation was selected from the group consisting of electro-corundum (Al2O3), boron-carbide (BC), silicone-carbide (SiC), titanium diboride (TiB2), boron nitride (BN), quartz (SiO2), garnet, zirconium, or a mixture of the above.

Russian Pat. RU 2,425,912 issued to Ulyanitsky et al. in 2011 discloses a procedure for metallization of polymer materials by detonation sputtering. Preliminary modification of surface of polymer material is performed by acceleration of particles of metal with a shock wave formed before detonation front causing their penetration into surface of polymer material. A metal layer is applied on modified surface with flow of these particles accelerated with products of detonation of gas mixture.

As would be appreciated by persons of skill in the art, the explosive methods described above are surface treatment methods which are not suitable for producing track membranes. What is needed is a method for new material treatment involving deep penetration.

One method of deep penetration is described in detail by S. Usherenko in U.S. Pat. No. 7,897,204 issued on Mar. 1, 2011. It is a process of strengthening the matrix of a high-speed steel for forming a composite tool material by SDP (Super Deep Penetration) of reinforcing particles into and through the matrix of the tool material. The particles interact with the matrix in the form of a high-speed jet generated and energized by an explosion of an explosive material that contains the premixed powdered components of the working medium composed of particles of a hard material and ductile metal, and if necessary, with an addition of a process liquid. The particles of the working medium material have dimensions ranging from 1 to 100 μm. The jet has a pulsating nature with the velocity in the range of 200 to 6000 m/sec and a temperature in the range 100 to 2000 C. As a result of strengthening, the steel matrix is reinforced by elongated zones of the working material particles which are oriented in the direction of the jet and occupy less than 1 vol. % of the matrix material, while less than 10 vol. % is occupied by the zones of the matrix restructured as a result of interaction with the particles of the super-high velocity jet.

However, a demand exists for explosive material treatment methods that could be applicable for treating materials other than metals, e.g., for the preparation of polymeric membranes.

SUMMARY OF THE INVENTION

The inventive methodology is directed to methods and systems that substantially obviate one or more of the above and other problems associated with conventional techniques for manufacturing track membranes.

In accordance with one aspect of the invention, there is provided a method for manufacturing track membranes by deep penetration of a material. The method is carried out by using a matrix material of the membrane and special working substances which interact with the matrix in the form of a high-speed jet generated and energized by an explosion of an explosive material. The special working substance comprises a saturated or supersaturated aqueous solution or solutions of water soluble organic salts, or a saturated or supersaturated aqueous solution or solutions of water soluble inorganic salts. The matrix material comprises an organic polymer material in the form of a solid plate.

In accordance with another aspect of the invention, a device for practicing of the method comprises a shell in the form of a tube one end of which contains a cartridge with an explosive material and a working substance in the form of a solution of a water-soluble salt or salts. Inserted freely into the other end of the shell is a holder that contains a membrane matrix to be treated, which has a shape of a plate. The open end of the holder is closed by a cover which is attached to the holder, e.g. by screws, whereby the membrane matrix is secured in the holder. The shell with the cartridge that contains the explosive material and the working substance as well as the holder with the matrix of the material to be treated is placed into an explosion-proof chamber, and the explosive material is detonated to cause and explosion. As a result, the working substance is expelled from the cartridge by an explosive wave in the form of a high-speed jet and penetrates deep into and through the polymer material of the plate. Under the effect of the explosion, the holder with the polymer plate and cover is ejected from the shell into the explosion-proof chamber. The cover is disconnected from the holder, the matrix is extracted, and is subjected to treatments with water that dissolves the water-soluble particles or washes them out from the membrane matrix thus forming microscopic openings that pass through the polymer plate. Then the polymer plate is sliced into thin pieces that can be used, e.g., as filter plates.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 2 is a diametric sectional view of a polymer plate obtained by the method of the invention.

FIG. 3 is a diametric sectional view of a track membrane produced by the method of the invention.

DETAILED DESCRIPTION

Figure 1:
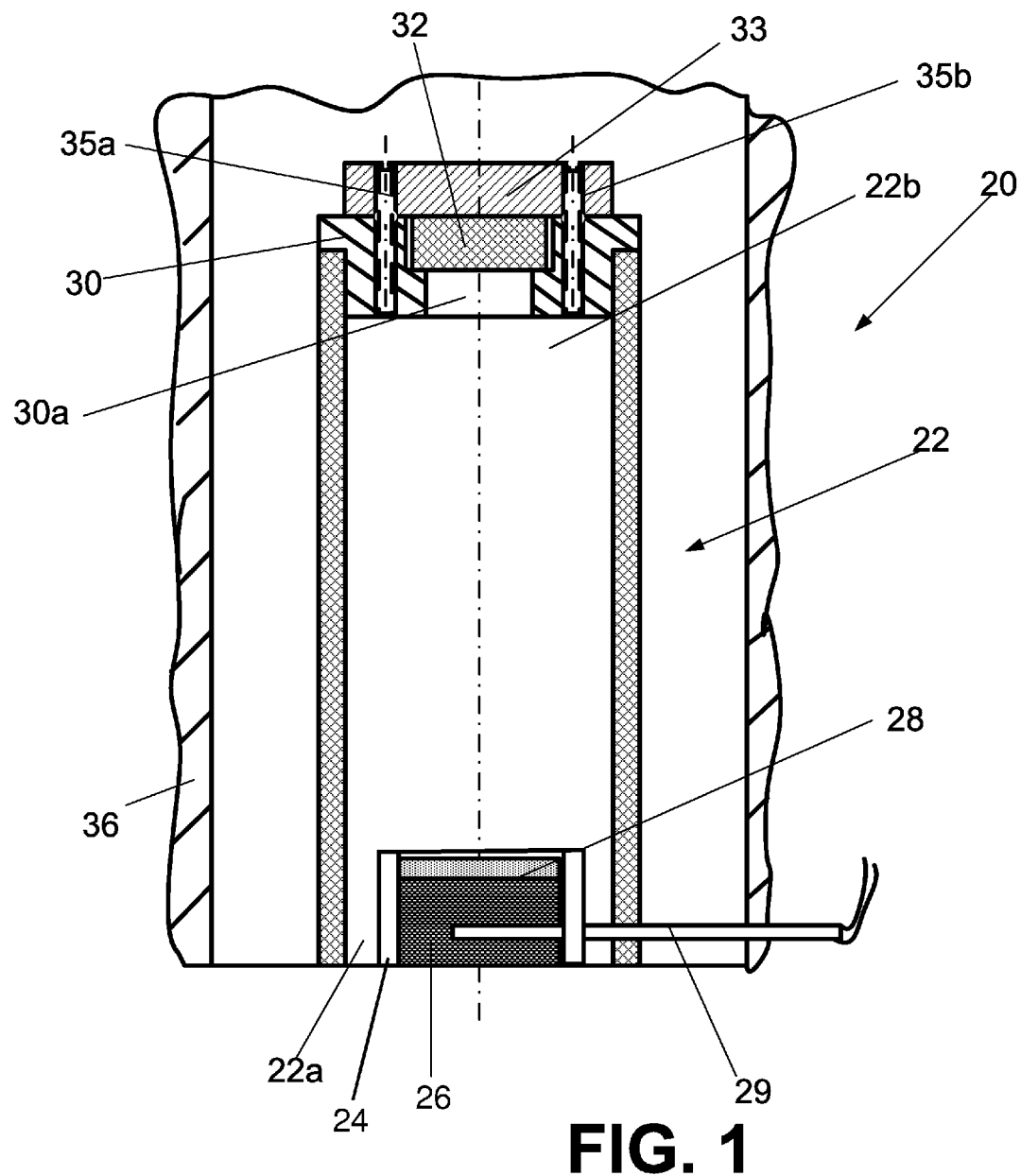
FIG. 1 is a vertical sectional view of a device that can be used for realization of the method of the invention.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

The method of one or more embodiments of the invention is aimed at manufacturing track membranes. A track membrane is a thin polymer film with through pores which are formed by penetrating a special substance into and through the material of a polymer plate and then removing the traces of penetrated particles from the matrix material thus forming pores. The track membrane may find use in various fields of industry as conventional membrane filters for purification of liquid substances from solid contaminants. In view of low manufacturing cost and only a slight deviation of the holes from the rated diameter (within the limits of 10 to 20%), the track membrane of the invention may be advantageously used as a dialysis filter.

In general, a method of one or more embodiments of the invention comprises forming membrane with through openings by piercing a membrane matrix located in a tubular shell with particles of an oversaturated aqueous soluble solution of a water-soluble salt or salts contained in a high-speed jet generated by explosion of an explosive material detonated in the same shell. The obtained membrane is suitable for use as a filter for separating liquids from solid particles that may be contained in such liquids.

More specifically, the method of one or more embodiments of the invention comprises the steps of:

providing an explosion-proof chamber;

providing a shell having a first end and a second end;

providing a cartridge that is secured at the first end of the shell and contains a detonatable explosive material and a working substance in the form of at least one supersaturated solution of at least one water-soluble salt;

providing a holder that has an open-bottom cavity and is freely insertable into the second end of the shell;

providing a membrane matrix made from a plastic material and insertable into the recess of the holder;

Providing a cover for covering the open-bottom recess of the holder from the side of the first end of the shell, the cover being attachable to the holder;

placing a membrane matrix into the recess of the holder and securing the membrane matrix in the recess of the holder by attaching the cover to the holder so that a major part of the membrane matrix is exposed to the interior of the shell;

placing the shell with the cartridge and the membrane matrix in the holder with the cover into an explosion-proof chamber;

generating an explosive wave by detonating the explosive material of the cartridge thus forming a high-speed jet of the particles of the working substance;

forming a plurality of through holes in the membrane matrix by piercing the membrane matrix with said particles thus producing the track membrane having residual particles of the working substance and expelling the cover with the holder and the membrane matrix from the shell into the explosion-proof chamber; and opening the cover and removing the track membrane from the holder.

In one or more embodiments, the method further comprises the step of disconnecting the cover from the holder, removing the membrane matrix having residual water-soluble particles of the working substance from the cavity of the retainer, and treating the membrane matrix with water for dissolving the residual particles or washing them out from the membrane matrix and for forming a membrane with through openings.

In one or more embodiments, thereafter, the polymer plate is sliced into thin pieces of a require thickness that can be used, e.g., as filter plates. The thin pieces again are subjected to a second water treatment for final rinse.

In one or more embodiments, the membrane matrix material is an organic polymer material such as polyolefin (polyethylene, polypropylene, etc.), polyvinylchloride, fluorinated polyolefin (polytetrafluoroethylene, polyvinylidene fluoride, etc.), polyamide, polycarbonate, polyester, polysulfone, etc.

In one or more embodiments, the working substance may also contain at least one saturated solution of water soluble salts and may be selected from the group consisting of saturated aqueous solution of at least one water-soluble organic salt, a supersaturated aqueous solution of at least one water-soluble organic salt, a saturated aqueous solution of at least one water soluble inorganic salt, and a supersaturated aqueous solution of at least one water-soluble inorganic salt.

In one or more embodiments, the organic salts are selected from the group comprising tartrates, acetates, salicylates, benzoates of alkali metals, for example potassium tartrate, sodium acetate, sodium salicylate. The inorganic salts are selected from the group comprising halides of the alkali metals and alkaline earth metals, for example sodium chloride, sodium bromide, potassium fluoride, calcium chloride.

In one or more embodiments, the solid plate of the matrix polymer materials may have a total thickness in the range of 10 to 20 mm. After piercing with the particles the plate is sliced into track membranes having a thickness of 5 to 50 μm by means of a microtome.

In one or more embodiments, the through holes formed in the track membrane by the method of the invention may have diameters ranging from 80 nm to 100,000 nm. The actual diameters and the range of the diameters of the holes depend mainly on the velocity of the particles, diameter of the shell, and a distance from the cartridge with the explosive material and the particles to the membrane matrix material in the holder. The through holes produced in the track membrane by the method of the invention are oriented in the direction of the jet of particles and occupy from 10 to 20 vol. % of the membrane material volume.

In one or more embodiments, the explosion wave that has a detonating nature imparts to the particles of the working substance a velocity in the range of 3800 to 4200 m/sec.

In one or more embodiments, removal of the residual trace particles of the substance from the membrane may be carried out in the running flow of water.

An exemplary device for carrying out the method of one or more embodiments the invention is shown in the attached drawings, where FIG. 1 is a vertical sectional view of the device.

As shown in FIG. 1, in one or more embodiments, the device, which as a whole is designated by reference numeral 20 contains a tubular shell 22 made, e.g., of a plastic material such as polyvinylchloride. The tubular shell 22 has open ends 22a and 22b. The device 20 also contains a cartridge 24 with the aforementioned detonatable explosive material 26 and the working substance 28 in the form of a saturated/supersaturated solution of at least one water-soluble salt. The cartridge is inserted into the open end 22a of the tubular holder 22. Reference numeral 29 designates a detonator that is used for detonation of the explosive material 26.

Furthermore, in one or more embodiments, the device 20 contains a membrane holder 30 with an open-bottom cavity 30a for receiving a membrane matrix 32 that can be inserted into the cavity 30a of the holder 30 so that when the holder 30 is inserted into the shell 22, a major part of the membrane surface remains exposed to the interior of the tubular shell. The membrane holder 30 is provided with a cover 33 attachable to the holder 30, e.g., by fasteners, such as studs 35a and 35b shown in FIG. 1, for covering the membrane matrix 32. The holder 30 with the membrane matrix 32 and the cover 33 is freely inserted into the opposite end 22b of the tubular shell 22.

In one or more embodiments, the shell 22 with the holder 30 and the cartridge 24 is placed into an explosion-proof chamber 36.

In one or more embodiments, when the explosive material 26 is detonated by the detonator 29, this generates an explosion inside the shell 22. As a result of the explosive waves which occurs inside the shell 22, the particles of the working material substance 28 that comprises the high-speed jet of the water-soluble salt, formed from the saturated/supersaturated aqueous solution of water soluble organic or inorganic salts, will be directed toward the surface of the membrane matrix 32 exposed to the high-speed flow of the particles, in view of high kinetic velocity (3800 to 4200 m/sec) imparted to the particles of the working substance.

In one or more embodiments, some particles will deeply penetrate into the membrane matrix material and some particles will pierce the body of the membrane matrix 32 from its exposed side. Under the effect of the explosive wave, the holder 30 together with the membrane matrix 32 and the cover 33 will be expelled from the shell 22 into the explosion-proof chamber 36. At the same time, the shell 22 and cartridge 24 will collapse. The cover 33 is then disconnected from the holder 30, and the treated membrane matrix 32 is extracted from the holder 30. However, the membrane matrix 32 will still contain residue of the water-soluble particles of the working substance 28.

In one or more embodiments, the membrane matrix material 32 is then washed with water, whereby the residue of the water-soluble particles of the working substance 28 is dissolved or washed out from the membrane matrix leaving a plurality of small-diameter holes. As a result, a polymer plate 40 shown in FIG. 2 with a plurality of small holes 40a, 40b, ... 40n is obtained. By selecting the treatment conditions such as described in this application the diameters of the holes may be selected within the range of 80 nm to 100,000 nm. However, deviations of the hole diameters from the rated value is insignificant and may be within the range of 10% to 20%.

In one or more embodiments, the solid plate 40 of the matrix polymer materials may have a total thickness in the range of 10 to 20 mm. After removal of the residue of the working substance, the solid plate 40 is sliced into track membranes having a thickness of 5 to 50 μm by means of a microtome. As a result, track membranes, one of which, i.e., a track membrane 42 is shown in FIG. 3, are obtained.

Figure 4A:
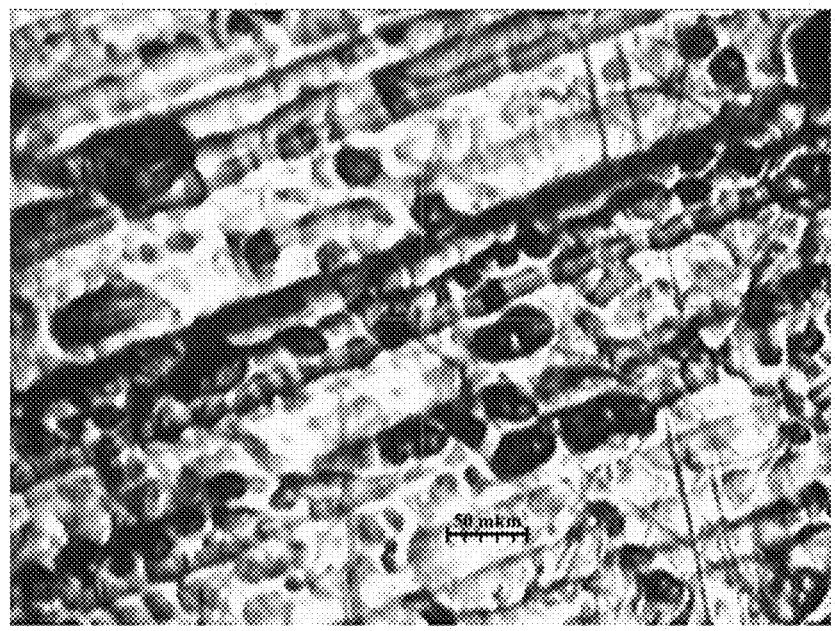
FIGS. 4A and 4B are microphotographs of sections of treated samples obtained on a Multimode V Atomic Force Microscope (Veeco).
Figure 4B:

Samples of the track membranes produced by a method of an embodiment of the invention were observed under a Multimode V Atomic Force Microscope (Veeco), and micropictures were taken (see FIGS. 4A and 4B). The pictures show sections of samples taken parallel to the diameter of the polymeric cylinder by means of microtome. The black dots in the photographs represent the pores of the sliced samples.

Various embodiments of the invention will now be illustrated by application examples.

Application Example 1

Specimen 1 of a polymer plate produced by the method of an embodiment of the invention comprised a 15 mm-thick circular plate made from a shock-resistant polyethylene. The working substance comprised a supersaturated aqueous solution of potassium tartrate having concentration of 60% by weight. The test was conducted with the use of the device of the type described above and shown in FIG. 1. Length of the shell 22 was 200 mm, explosive material 26 was 25 g of ammonite #6 (79% w/w of ammonium nitrate and 21% w/w of TNT; density 0.8-0.9 g/cm3). The velocity of particles of potassium tartrate developed under the effect of the explosive wave and by flash evaporation of water was 3800 m/s. The results are shown in the microphotography presented by FIG. 4A, where the pores formed in the matrix material after washing out the residue of the potassium tartrate particles are seen as black spots. The rated diameter of the holes was 22 µm with deviations from the value of 22 µm in the range of 13%.

Application Example 2

Specimen 2 of a polymer plate produced by a method of an embodiment of the invention comprised a 15 mm-thick circular plate made from a polytetrafluoroethylene. The working substance comprised a 30% w/w aqueous solution of sodium chloride. The test was conducted with the use of the device of the type described above and shown in FIG. 1. Length of the shell 22 was 200 mm, explosive material 26 was 25 g of ammonite #6 (79% w/w of ammonium nitrate and 21% w/w of TNT; density 0.8-0.9 g/cm3). The velocity of particles of sodium chloride developed under the effect of the explosive wave and by flash evaporation of water was 4200 m/s. The results are shown in the microphotography presented by FIG. 4B, where the pores formed in the matrix material after washing out the residue of the sodium chloride particles are seen as black spots. The rated diameter of the holes was 25 µm with deviations from the value of 25 µm in the range of 19%.

Although the invention has been shown and described with reference to specific embodiments, these embodiments should not be construed as limiting the areas of application of the invention, and any changes and modifications are possible provided these changes and modifications do not depart from the scope of the attached patent claims.

Moreover, other implementations of the invention will be apparent to those skilled in the art from consideration of the specification and practice of the invention disclosed herein. Various aspects and/or components of the described embodiments may be used singly or in any combination in the method for manufacturing track membranes. It is intended that the specification and examples be considered as exemplary only, with a true scope and spirit of the invention being indicated by the following claims.

What is claimed is:

1. A method of manufacturing track membranes comprising the steps of: piercing a membrane matrix located in a tubular shell with particles formed from an oversaturated aqueous soluble solution of a water-soluble salt or salts contained in a high-speed jet generated by explosion of an explosive material detonated in the shell, removing residual particles of salts by washing the membrane matrix with water; and then slicing the membrane matrix into track membranes.

2. The method of claim 1, comprising the steps of placing the membrane matrix prior to piercing by the explosion into a holder, inserting the holder with the membrane matrix into one end of the tubular shell, providing an explosive material placed into a cartridge together with said oversaturated aqueous soluble solution of a water-soluble salt or salts, inserting the cartridge into another end of the tubular shell, placing the shell with the holder and the cartridge into an explosion-proof chamber, and initiating the explosion by detonating the explosive material.

3. The method of claim 2, wherein the membrane matrix has a thickness in the range of 10 mm to 20 mm, and the track membrane has a thickness in the range of 5 µm to 50 µm.

4. The method of claim 2, wherein the membrane matrix is made from an organic polymer material.

5. The method of claim 4, wherein the organic polymer material is selected from the group consisting of polyethylene, polypropylene, polyvinylchloride, polytetrafluoroethylene, polyvinylidene fluoride, polyamide, polycarbonate, polyester, and polysulfone.

6. The method of claim 4, wherein the water-soluble salt is selected from the group consisting of tartrate, acetate, salicylate, benzoate of an alkali metals, halide of an alkali metals and of an alkaline earth metals.

7. A method of manufacturing track membranes comprising the steps of:
providing an explosion-proof chamber;
providing a shell having a first end and a second end;
providing a cartridge that is secured at the first end of the shell and contains a detonatable explosive material and a working substance in the form of at least one supersaturated solution of at least one water-soluble salt;
providing a holder that has an open-bottom cavity and is freely insertable into the second end of the shell;
providing a membrane matrix made from a plastic material and insertable into the recess of the holder;
providing a cover for covering the open-bottom recess of the holder from the side of the first end of the shell, the cover being attachable to the holder;
placing a membrane matrix into the recess of the holder and securing the membrane matrix in the recess of the holder by attaching the cover to the holder so that a major part of the membrane matrix is exposed to the interior of the shell;
placing the shell with the cartridge and the membrane matrix in the holder with the cover into the explosion-proof chamber;
generating an explosive wave by detonating the explosive material of the cartridge thus forming a high-speed jet of the particles of the working substance;
forming a plurality of through holes in the membrane matrix by piercing the membrane matrix with said particles thus producing the membrane matrix having residual particles of the working substance and expelling the cover with the holder and the membrane matrix from the shell into the explosion-proof chamber; and
opening the cover and removing the track membrane from the holder.

8. The method of claim 7, further comprising the step of disconnecting the cover from the holder, removing the membrane matrix having residual water-soluble particles of the working substance from the cavity of the retainer, and treating the membrane matrix with water for dissolving the residual particles or washing them out from the membrane matrix and for forming a membrane matrix with through openings.

9. The method of claim 8, comprising the step of slicing the membrane matrix into pieces for forming track membranes, and washing the track membranes with water.

10. The method of claim 9, wherein the membrane matrix is made from an organic polymer material.

11. The method of claim 10, wherein the organic polymer material is selected from the group consisting of polyethylene, polypropylene, polyvinylchloride, polytetrafluoroethylene, polyvinylidene fluoride, polyamide, polycarbonate, polyester, and polysulfone.

12. The method of claim 11, wherein the working substance further comprises at least one saturate solution of at least one water-soluble salt and is selected from the group consisting of a saturated aqueous solution of at least one water-soluble organic salt, a supersaturated aqueous solution of at least one water-soluble organic salt, a saturated aqueous solution of at least one water soluble inorganic salt, and a supersaturated aqueous solution of at least one water-soluble inorganic salt.

13. The method of claim 12, wherein the organic salt is selected from the group consisting of tartrate, acetate, salicylate, and benzoate of an alkali metals, and wherein the inorganic salt is selected from the group consisting of halide of an alkali metals, and an alkaline earth metals.

14. The method of claim 9, wherein the membrane matrix has a thickness in the range of 10 mm to 20 mm, and the track membranes have a thickness in the range of 5 µm to 50 µm.

15. The method of claim 14, wherein the step of slicing is carried out with the use of a microtome.

16. The method of claim 13, wherein, depending on the treatment conditions, the through holes formed in the track membrane have diameters ranging from 80 nm to 100,000 nm with deviations from the rated value in the range of 10% to 20%.

17. The method of claim 16, wherein the range of diameters of the through holes is adjusted by selecting velocity of the particles, diameter of the shell, and a distance from the cartridge with the explosive material and the particles to the membrane matrix in the holder.

18. The method of claim 17, wherein the explosion wave that has a detonating nature imparts to the particles of the working substance a velocity in the range of 3800 to 4200 m/sec.

* * * * *